United States Patent
Doros

(10) Patent No.: US 12,467,875 B2
(45) Date of Patent: Nov. 11, 2025

(54) MULTI-SENSOR TEST DEVICE FOR QUALITY CONTROL SCANNING

(71) Applicant: Micron Technology, Inc., Boise, ID (US)

(72) Inventor: Theodore G. Doros, Fairfax, VA (US)

(73) Assignee: Micron Technology, Inc., Boise, ID (US)

( * ) Notice: Subject to any disclaimer, the term of this patent is extended or adjusted under 35 U.S.C. 154(b) by 484 days.

(21) Appl. No.: 17/823,806

(22) Filed: Aug. 31, 2022

(65) Prior Publication Data

US 2024/0068952 A1    Feb. 29, 2024

(51) Int. Cl.
*G01N 21/88* (2006.01)
*G06T 7/00* (2017.01)

(52) U.S. Cl.
CPC ....... *G01N 21/8851* (2013.01); *G06T 7/0004* (2013.01); *G01N 2021/8864* (2013.01); *G01N 2021/888* (2013.01); *G05B 2219/32179* (2013.01); *G05B 2219/32193* (2013.01)

(58) Field of Classification Search
CPC ....... G01N 21/8851; G01N 2021/8864; G01N 2021/888; G06T 7/0004; G05B 2219/32179; G05B 2219/32193
See application file for complete search history.

(56) References Cited

U.S. PATENT DOCUMENTS

| | | |
|---|---|---|
| 11,045,842 B2 | 6/2021 | Nygaard et al. |
| 11,311,346 B1 * | 4/2022 | Budill .................. G06T 7/0014 |
| 2005/0251370 A1 * | 11/2005 | Li .................... G01R 31/31707 |
| | | 702/190 |
| 2020/0160083 A1 * | 5/2020 | Zhu .......................... G06N 3/08 |
| 2022/0335254 A1 * | 10/2022 | McCrackin ............. G06F 18/24 |
| 2022/0343486 A1 * | 10/2022 | McCrackin ........... G06T 7/0004 |
| 2023/0030779 A1 * | 2/2023 | DeLuca ................ G06V 10/945 |
| 2023/0086626 A1 * | 3/2023 | Pulikottil ........... G01R 31/2834 |
| | | 73/160 |
| 2023/0106360 A1 * | 4/2023 | Pattipati ................. G06N 20/00 |
| | | 315/307 |

(Continued)

OTHER PUBLICATIONS

Korodi, A.; Anitei, D.; Boitor, A.; Silea, I. Image-Processing-Based Low-Cost Fault Detection Solution for End-of-Line ECUs in Automotive Manufacturing. Sensors 2020, 20, 3520. https://doi.org/10.3390/s20123520 (Year: 2020).*

(Continued)

*Primary Examiner* — Utpal D Shah
(74) *Attorney, Agent, or Firm* — Harrity & Harrity, LLP

(57) ABSTRACT

In some implementations, a test device may initiate a set of measurements by a set of sensors of the test device and of a device under test (DUT), wherein the DUT is a memory device. The test device may obtain the set of measurements of the DUT from the set of sensors based on initiating the set of measurements. The test device may analyze the set of measurements of the DUT, using a first model, to identify one or more defects present with the DUT. The test device may determine, using a second model, that the one or more defects present with the DUT satisfy a failure threshold. The test device may provide, based on the failure threshold being satisfied for the DUT, an output indicating that the failure threshold is satisfied for the DUT.

25 Claims, 9 Drawing Sheets

(56) References Cited

U.S. PATENT DOCUMENTS

2023/0306578 A1* 9/2023 Pickerd .................. G06V 10/82

OTHER PUBLICATIONS

Ren, Zhonghe, et al. "State of the art in defect detection based on machine vision." International Journal of Precision Engineering and Manufacturing-Green Technology 9.2 (2022): 661-691. (Year: 2022).*
Abd Al Rahman, M., and Alireza Mousavi. "A review and analysis of automatic optical inspection and quality monitoring methods in electronics industry." Ieee Access 8 (2020): 183192-183271. (Year: 2020).*
R. G. Wright, "Multiresolution sensor fusion approach to PCB fault detection and isolation," 2008 IEEE Autotestcon, Salt Lake City, UT, USA, 2008, pp. 41-46, doi: 10.1109/AUTEST.2008.4662581. (Year: 2008).*
Kang & Atul, "Bayer Filter," TheAILearner: Matering Artificial Intelligence, https://theailearner.com/2018/10/28/bayer-filter/, Oct. 28, 2018, 2 pages.
Santec: The Pholonics Pioneer: Santec Corporation Homepage, santec.com/en/products/oct/3DOpticalProfiler/, 7 pages.

* cited by examiner

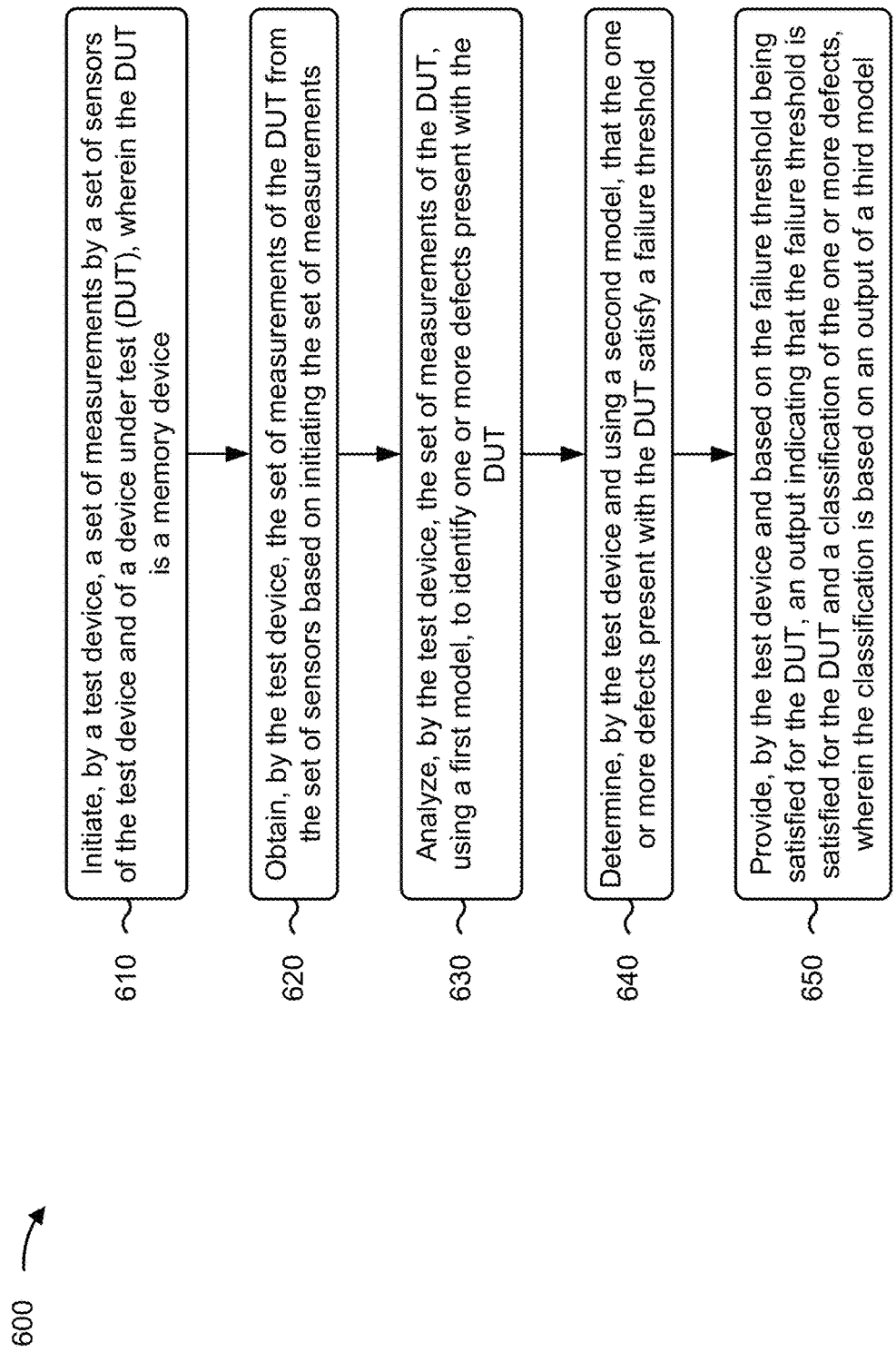

MULTI-SENSOR TEST DEVICE FOR QUALITY CONTROL SCANNING

TECHNICAL FIELD

The present disclosure generally relates to test devices and, for example, a multi-sensor test device for quality control scanning.

BACKGROUND

Quality control is a process by which an entity reviews and ensures the quality of a component. For example, a device manufacturer may use quality control procedures to ensure that defective devices are not shipped to customers. An entity may subject a component to one or more tests to determine whether to pass the component or fail the component. A failure may indicate that a defect is present with the component. For example, a device manufacturer may perform a physical inspection of a device to determine whether there are any visible defects, such as cracks, discolorations, or other deviations from a reference device (e.g., a device determined to be without defect). Some entities may follow a standard with respect to quality control. For example, the International Organization for Standardization (ISO) has published the ISO 9000 for quality management, among other standards. Similarly, the American National Standards Institute (ANSI) has published the Electro-static Discharge (ESD) S2020 Certification for quality control, among other standards. Different testing devices may be used to detect defects in accordance with such standards.

BRIEF DESCRIPTION OF THE DRAWINGS

FIG. 6 is a flowchart of an example method associated with using a multi-sensor test device for quality control scanning.

DETAILED DESCRIPTION

Figure 1A:
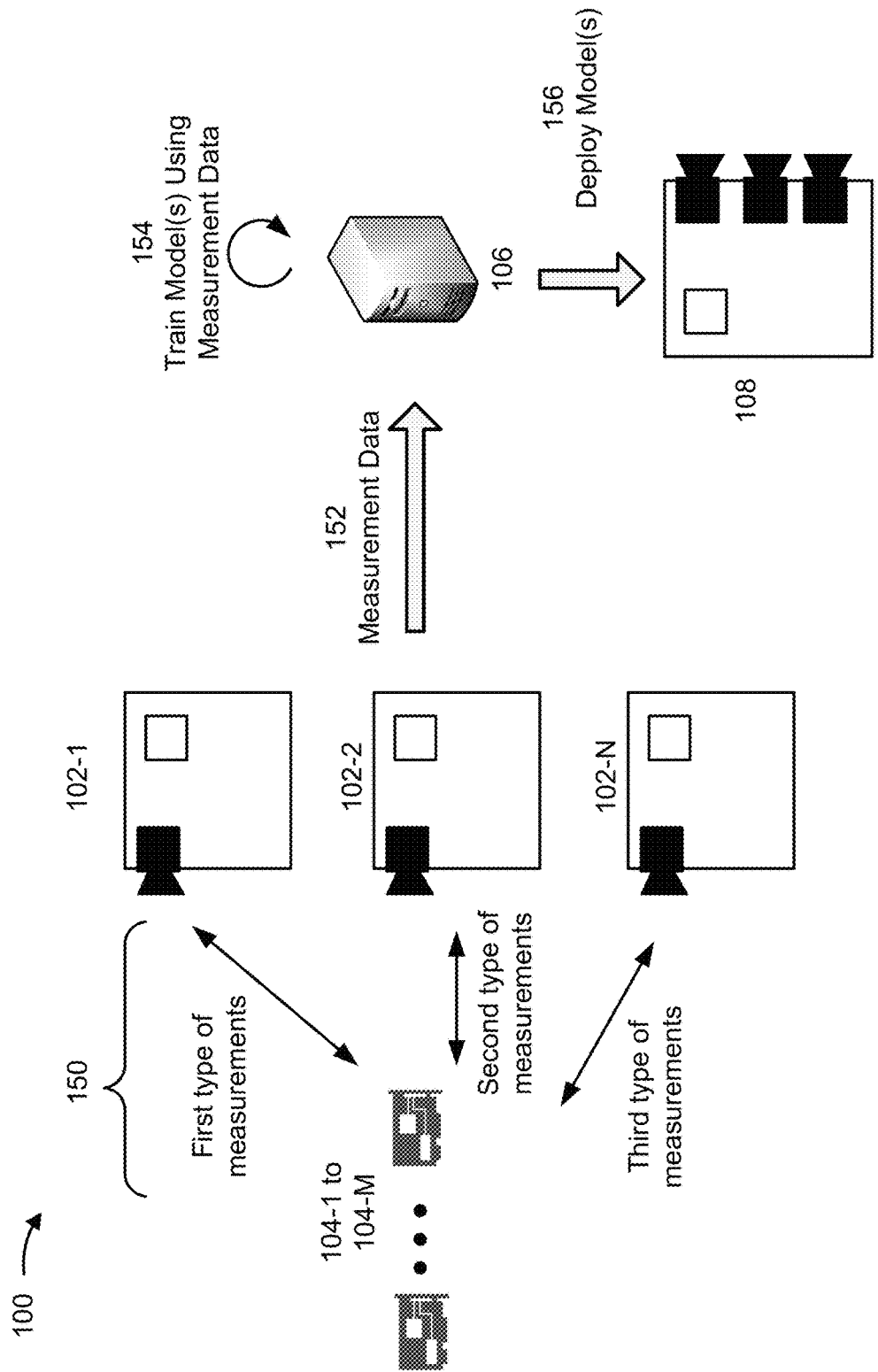
FIGS. 1A-1D are diagrams illustrating an example of using a multi-sensor test device for quality control scanning.

Quality control or quality management procedures may include the use of many different types of testing devices to detect defects with an object (e.g., a component, a device, or a device under test (DUT)). For example, a technician may use a LIDAR device, a polariscope, a three-dimensional (3D) imaging scanner, an ultraviolet (UV) light emitter, an ultrasonic emitter, or a microscope to analyze an object and determine whether a defect is present. An amount of time to switch between using different test devices can result in excessively slow inspection of objects. Accordingly, manufacturers, such as at semiconductor manufacturing facilities (Fabs), may use statistical inspection procedures (e.g., sampling) to inspect only a subset of objects rather than inspecting all objects. Although statistical inspection procedures can increase an inspection throughput (e.g., a quantity of objects that are 'passed', some of which are inspected and others of which are not inspected), because some objects are not inspected, some defective objects may be passed on to consumers. This may result in poor performance of devices that include such defective objects and/or expensive or resource wastage associated with replacing such defective objects. Furthermore, relying on many different separate test devices may result in a failure to detect some defects. For example, some defects may only be ascertainable in the presence of multiple testing devices. Accordingly, using multiple individual testing devices concurrently may result in a failure to identify some defects that are not or are difficult to identify from a single type of observation.

Some implementations described herein provide a test device including a set of sensors configured for identifying defects in a component, device under test (DUT), or other object. For example, a multi-sensor test device may have a housing for multiple types of sensors, such as optical imaging sensing (e.g., at different wavelengths), polarimetry sensing, acoustic sensing, or chemical sensing (e.g., outgassing sensing), among other examples. The multi-sensor test device may be provided with one or more artificial intelligence models for analyzing sensor data from the multiple sensors to detect and/or classify a defect. In this way, a speed of defect detection is increased relative to using individual sensor devices sequentially, thereby enabling defect detection to be performed on an entire manufacturing line of, for example, DUTs rather than on a statistical sample.

Moreover, by using one or more artificial intelligence models to analyze sensor data from multiple types of sensors, the multi-sensor test device increases a likelihood of successfully detecting defects, thereby reducing a likelihood of deploying defecting DUTs, components, or other objects. By reducing a likelihood of deploying DUTs, components, or other objects with defects, the multi-sensor test device reduces a wastage of resources associated with replacement or repair of defective DUTs, components, or other objects. The multi-sensor test device may be used at, for example, a semiconductor manufacturing facility for testing incoming parts (e.g., for assembly at the semiconductor manufacturing facility) or outgoing parts (e.g., for shipping to customers of the semiconductor manufacturing facility). Additionally, or alternatively, the multi-sensor test device may be used for periodic testing and change out of parts. For example, the multi-sensor test device may be used to identify whether wear on a part, during usage, has resulted in a defect arising, thereby enabling a user of the multi-sensor test device to change out the part before there is a negative impact to operation using the part. It is contemplated that the multi-sensor test device may be used in other contexts.

Figure 1B:
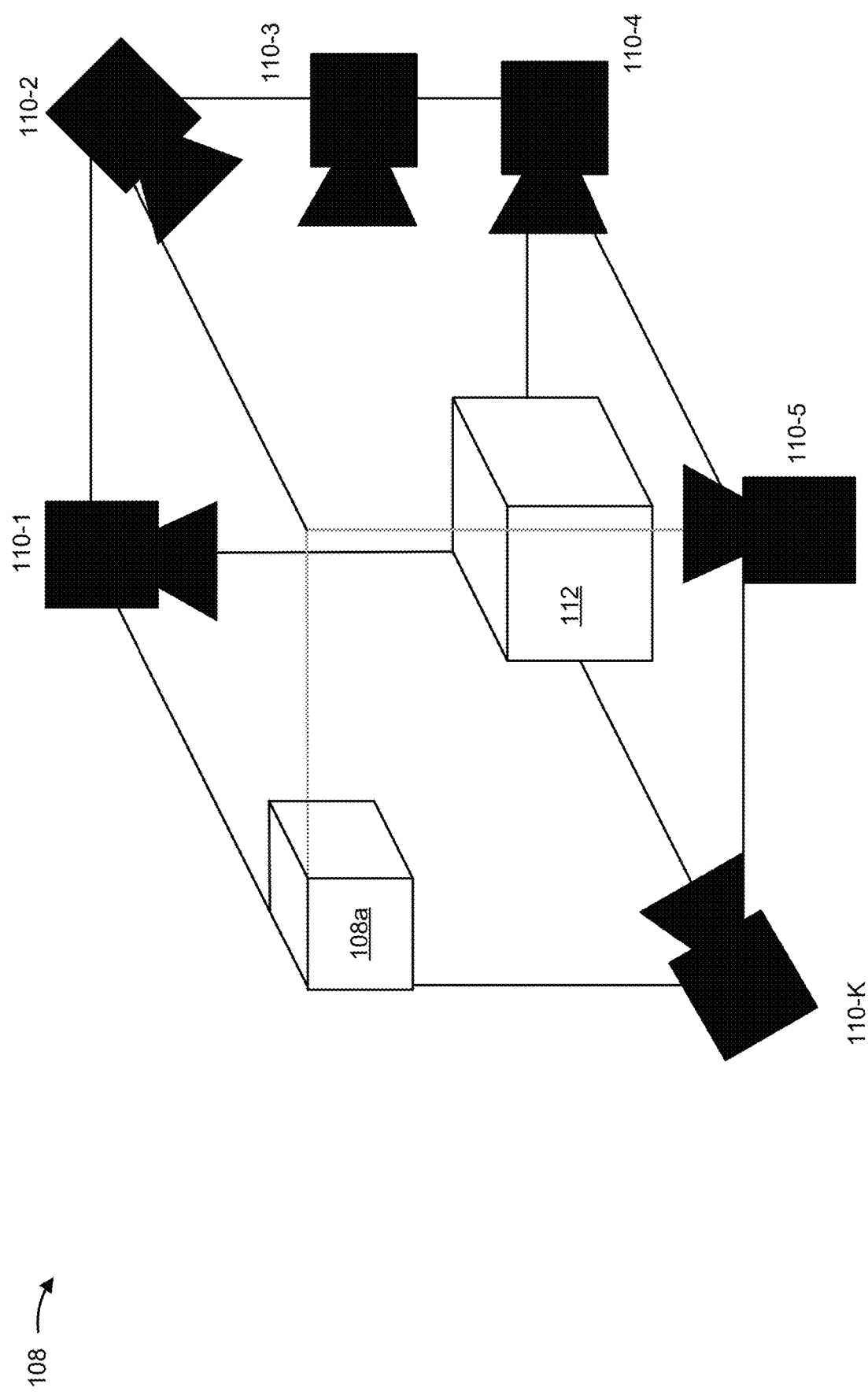

FIGS. 1A-1D are diagrams illustrating an example 100 of using a multi-sensor test device for quality control scanning. As shown in FIG. 1A, example 100 may include a set of sensors 102-1 through 102-N, a set of DUTs 104-1 through 104-M (e.g., a set of memory devices, such as a NAND memory device or a NOR memory device, a set of computing devices, such as a central processing unit (CPU) or a graphical processing unit (GPU), etc.), a test system 106, and a test device 108. As shown in FIG. 1B, the test device 108 includes a controller 108a and a plurality of sensors 110-1 through 110-K. For example, the test device 108 may have two or more sensors 110, three or more sensors 110, four or more sensors 110, or another higher quantity of sensors 110. In some implementations, the test device 108 may be a handheld test device. In some implementations, the test device 108 may be associated with a manufacturing line. For example, the test device 108 may be installed as a quality control step of a manufacturing process being performed by a manufacturing line.

As further shown in FIG. 1A, and by reference number 150, the set of sensors 102 may perform a set of measurements of the set of DUTs 104. For example, a first sensor 102-1 may perform a first type of measurement of the set of DUTs 104, a second sensor 102-2 may perform a second type of measurement of the set of DUTs 104, and/or an Nth sensor 102-N may perform an Nth type of measurement, among other examples. In some implementations, the set of sensors 102 may include a set of different types of sensors. For example, a sensor 102 may be a light detection and ranging (LIDAR) sensor (e.g., that can generate a three-dimensional (3D) image of a DUT 104), a polariscope (e.g., that detect stress in a transparent or translucent DUT 104), a handheld optical scanner (e.g., another type of sensor that can generate a 3D image of a DUT 104), an ultraviolet (UV) light sensor, or an ultrasonic horn (e.g., that generates acoustic energy) and infrared camera (e.g., that captures heat generation at a crack in a DUT 104 as a result of the acoustic energy), among other examples. Additionally, or alternatively, the set of sensors 102 may include an ultrasound lock-in thermography sensor, an active thermography sensor, or a time-of-flight diffraction (TOFD) sensor, among other examples.

As further shown in FIG. 1A, and by reference number 152, the test system 106 may obtain measurement data from the set of sensors 102. For example, the test system 106 may obtain information identifying a result of the first type of measurement performed on the set of DUTs 104, a result of a second type of measurement performed on the set of DUTs 104, and/or a result of the Nth type of measurement performed on the set of DUTs 104, among other examples. In some implementations, the test system 106 may trigger the set of sensors 102 to perform the set of measurements and provide the measurement data. For example, the test system 106 may transmit a command to perform the set of measurements and may receive measurement data as a response. Additionally, or alternatively, the test system 106 may receive the measurement data from a test data source, such as a device that stores results of quality control testing performed using the set of sensors (e.g., a device that stores the set of measurements and information indicating whether a measurement indicated a presence of a defect). Examples of defects (which may include irregularities or other changes that may or may not affect a functioning of a DUT), which may be detected from measurement data, include wear defects (e.g., fretting, chaffing, or fraying), deformation defects (e.g., compression or warpage), particulate defects (e.g., a presence of dust, oil, or contaminants), cosmetic defects (e.g., scratches, such as micro-scratches or macro-scratches, or blemishes), stress defects (e.g., internal stress defects), damage defects (e.g., punctures, bends, or tears), coating defects (e.g., uniformity defects, color defects, or film defects), outgassing defects (e.g., adhesive curing outgassing or volatile organic compounds (VOCs), TOFD defects (e.g., cracks or fractures), weight defects (e.g., failure to conform to a specification or a reference value), or part identity defects (e.g., an incorrect part or a part having incorrect physical or functional attributes, such as a part having a size defect, which may be an incorrect size), among other examples.

As further shown in FIG. 1A, and by reference number 154, the test system 106 may train one or more models using the measurement data. For example, as described in more detail herein, the test system 106 may train a model to identify defects in DUTs based on the measurement data regarding the set of DUTs 104. In some implementations, the test system 106 may train a defect identification model. For example, the test system 106 may train a computer vision model to analyze measurements to determine whether a defect is present with an object (e.g., on a surface of the object or in the object). In this case, the test system 106 may train the computer vision model to perform object detection (e.g., of a DUT, a sub-component of the DUT, or of a defect present in the DUT, such as a crack on a surface of a DUT), OCR-based part number identification, color uniformity detection, or particulate matter detection, among other examples. The computer vision model may take, as input, an image including a red green blue (RGB) pattern; separate out a red color plane, green color plane, and blue color plane (e.g., using a de-mosaic technique); and may analyze the different planes separately and/or collectively to make a prediction regarding an image.

Additionally, or alternatively, the test system 106 may train an artificial intelligence model of object failure. For example, the test system 106 may train a model to analyze a particular identified defect (or defects) and determine a likelihood of object failure from the particular identified defect (or defects). In this case, the test system 106 may use data regarding identified defects and failure rates of DUTs that included the identified defects to determine whether a defect satisfies a failure threshold. In other words, the test system 106 may train a model to determine whether a crack of a particular size in a DUT is associated with greater than a threshold likelihood of failure as a result of the crack. In this way, the model can enable a determination of whether an identified defect is critical (and a DUT with the identified defect should not be deployed) or non-critical (and a DUT with the identified defect can be deployed).

Additionally, or alternatively, the test system 106 may train a classification model. For example, the test system 106 may train an artificial intelligence model associated with classifying an identified defect as a particular type of defect and/or classifying the identified defect as being associated with a particular set of manufacturing parameters. In this case, the test system 106 enables identification of what type of defect has been identified and/or one or more process parameters that can be changed to avoid subsequent occurrences of the type of defect in subsequent DUTs. In some implementations, the test system 106 may use a set of reference measurements for training a model. For example, the test system 106 may have a set of reference measurements that represent measurements of a reference object without a defect or that represent theoretical measurements of a DUT (e.g., design parameters for the DUT, such as a designed size, a designed weight, a designed chemical composition, etc.). In this case, the test system 106 may train a model to compare obtained measurements of a DUT with the set of reference measurements and predict or identify defects in the DUT based on a difference between the obtained measurements and the set of reference measurements. For example, the model may be trained to filter signal (e.g., relevant differences between the set of reference measurements and the obtained measurements, such as a shadow from a crack in a surface of a DUT) from noise (e.g., differences between the set of reference measurements and the obtained measurements that may not correlate with a defect, such as a difference in image brightness or a presence of a shadow of an operator in an image). In some implementations, the test system 106 may train and/or obtain a computer vision model. For example, the test system 106 may use a computer vision model with feature engineering to analyze image data regarding the DUT and identify aspects, characteristics, and/or features of the DUT that may correspond to defects.

As further shown in FIG. 1A, and by reference number 156, the test system 106 may deploy the one or more models to the test device 108. For example, the test system 106 may provide information identifying a set of model parameters for the one or more models for use of the one or more models locally on the test device 108. Additionally, or alternatively, the test device 108 may receive information indicating that the test device 108 can communicate with the test system 106 to have the test system 106 analyze a result of a measurement using the one or more models. In other words, rather than deploying a local model to each test device 108, the test system 106 may use a global model to provide cloud-based analysis of measurements for many test devices 108.

Figure 1C:
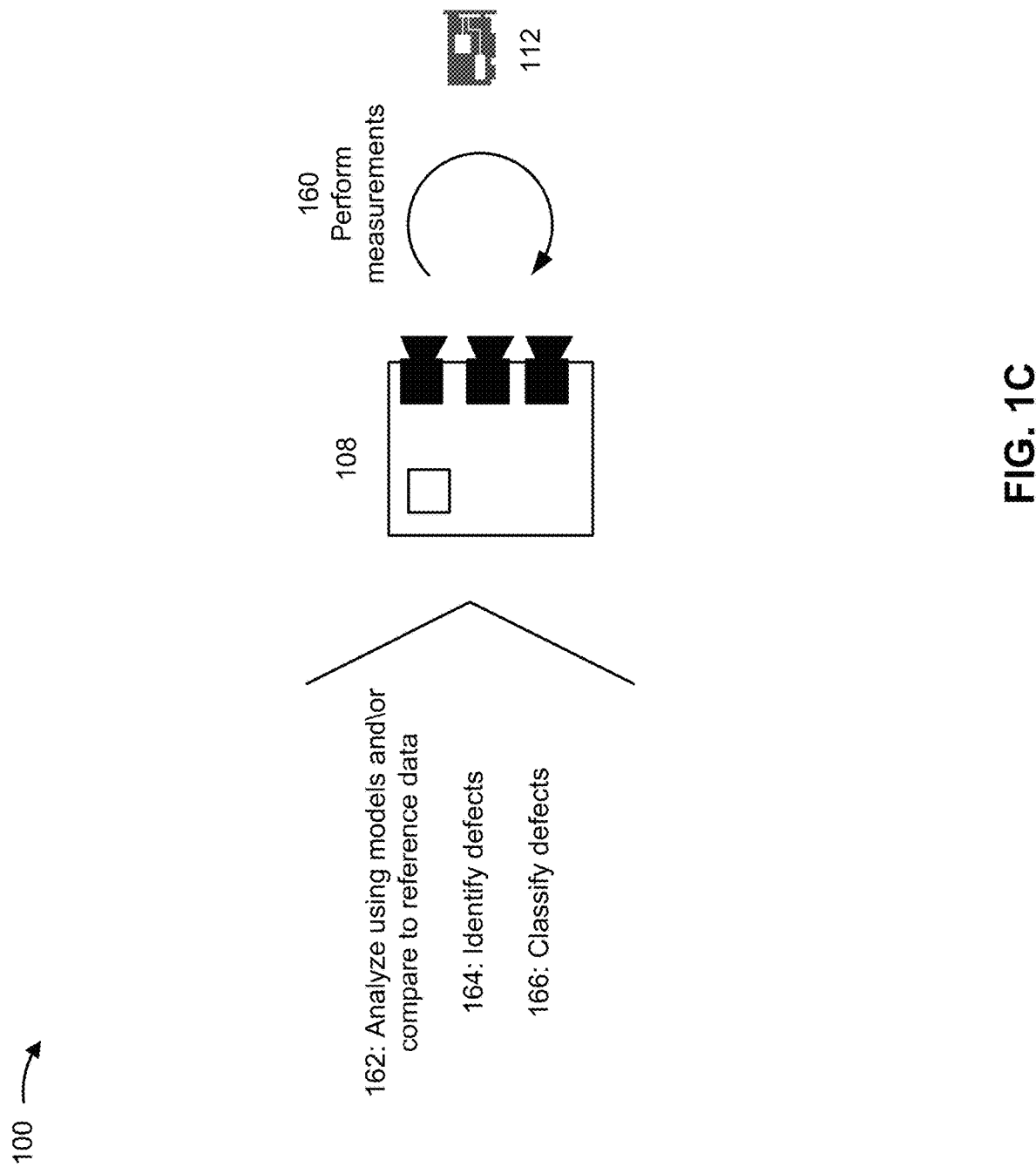

As shown in FIG. 1C, and by reference number 160, the test device 108 may perform a set of different types of measurements on a DUT 112 using sensors 110 of the test device 108. For example, the test device 108 may perform a first type of measurement, a second type of measurement, and/or a Kth type of measurement. In this case, the types of measurements may include one or more of an optical imaging measurement, a LIDAR measurement, a polarimetry measurement, an acoustic microscopy measurement, an ultrasonic thermography measurement, a time-of-flight diffraction with ultrasonic measurement, an optical character recognition measurement, a photogrammetry measurement, a microgram measurement, or an outgassing measurement. Additionally, or alternatively, although the test device 108 is described as having multiple sensors 110 incorporated into the test device 108, it is contemplated that the test device 108 may communicate with and obtain sensor data from one or more sensors external to the test device 108. For example, the test device 108 may communicate with an Internet of Things (IoT) environmental sensor to obtain environmental data regarding an environment in which the test device 108 is operating. Similarly, the test device 108 may enable attachment of one or more peripheral sensors (e.g., sensors external to an enclosure of the test device 108), which may enable expandable capabilities for the test device 108, such as a probe peripheral to enable the test device 108 to perform sensing in a difficult to access area where the entire test device 108 may not fit.

As further shown in FIG. 1C, and by reference numbers 162, 164, and 166, the test device 108 may use the one or more models to process the set of measurements and perform automated non-destructive defect detection. For example, the test device 108 may analyze the set of measurements using the one or more models, compare the set of measurements to reference data, identify one or more defects in the DUT 112, and/or classify the one or more defects, among other examples. In some implementations the test device 108 may detect a defect. For example, the test device 108 may determine that a measurement of the DUT 112 differs from a reference measurement and that a defect is present. Additionally, or alternatively, the test device 108 may determine that a combination of multiple measurements indicates the presence of a defect (e.g., that may not have been detectable by a single measurement, alone). For example, the test device 108 may use an imaging measurement (e.g., a UV fluorescence measurement of the DUT 112) and a non-imaging measurement (e.g., an acoustic measurement of the DUT 112) to determine that a crack is present in the DUT 112 (e.g., that may not have been identifiable based only on imaging measurements or based only on non-imaging measurements).

In some implementations, the test device 108 may classify a defect. For example, as described in more detail herein, the test device 108 may classify a defect as one or more of the aforementioned types of defects. Additionally, or alternatively, the test device 108 may generate a recommendation based at least in part on classifying the defect. For example, the test device 108 may generate a first recommendation for altering a process parameter to correct for a first type of defect and a second recommendation for altering a process parameter to correct for a second type of defect. In some implementations, the test device 108 may determine whether the defect satisfies a failure threshold. For example, the test device 108 may classify some defects as having less than a threshold likelihood of causing a failure with the DUT 112. In this case, the test device 108 may pass the DUT 112 and cause the DUT 112 to be installed in a computing system or deployed to a customer. Alternatively, when the defect is classified as having at least the threshold likelihood of causing a failure, the test device 108 may fail the DUT 112 and cause the DUT 112 to be discarded or repaired.

Figure 1D:
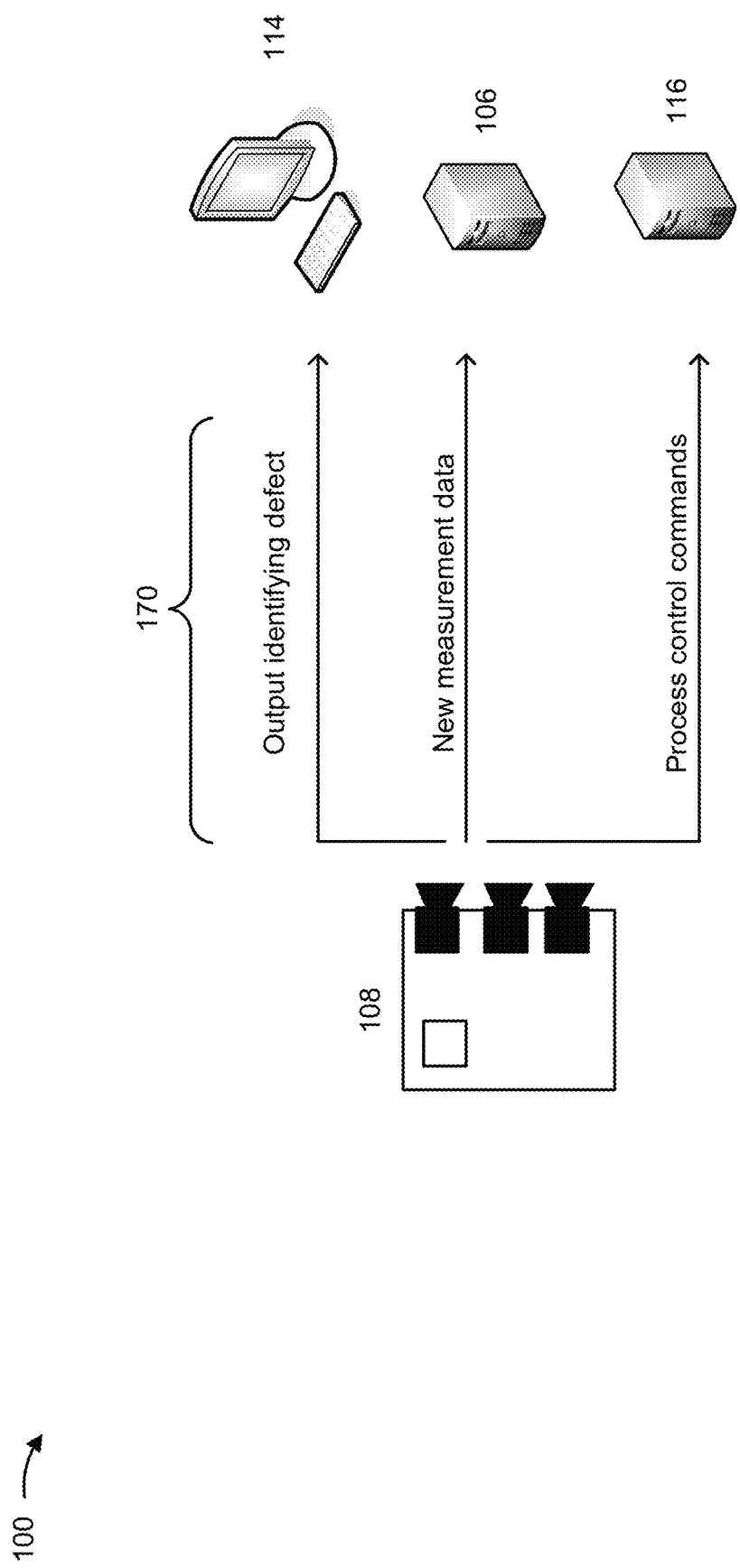

As shown in FIG. 1D, and by reference number 170, the test device 108 may provide output associated with processing the set of measurements. For example, the test device 108 may provide, to a client device 114 (e.g., for display to a user), output identifying a defect identified with the DUT 112. Additionally, or alternatively, the test device 108 may provide, to the test system 106, new measurement data identifying the set of measurements (e.g., to enable the test system 106 to update the one or more models). Additionally, or alternatively, the test device 108 may provide, to a manufacturing control system 116, one or more process control commands. For example, based on identifying a defect in the DUT 112, the test device 108 may cause an alteration to a manufacturing process to reduce a likelihood of the defect occurring in subsequent DUTs.

As indicated above, FIGS. 1A-1D are provided as an example. Other examples may differ from what is described with regard to FIGS. 1A-1D.

Figure 2:
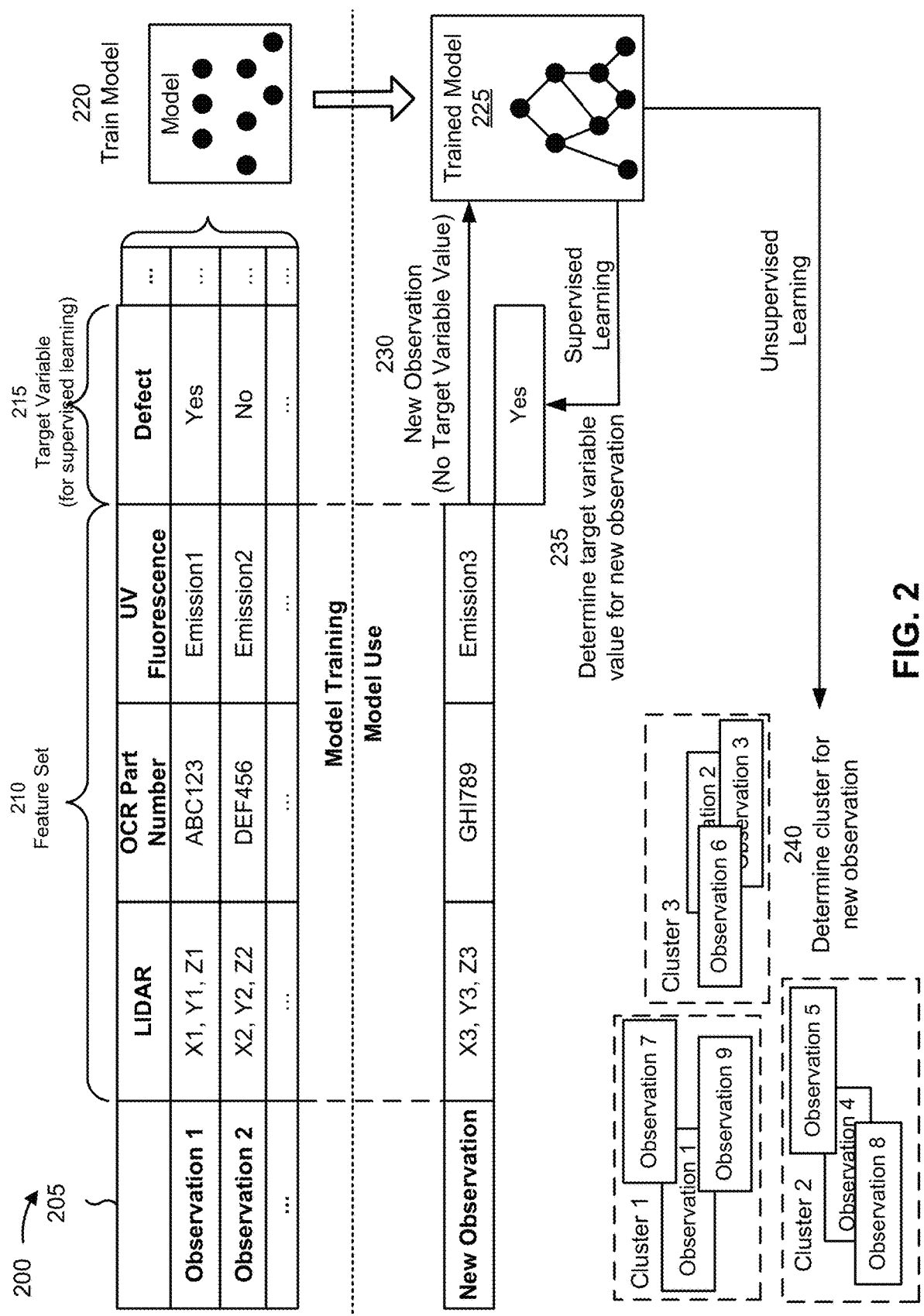
FIG. 2 is a diagram illustrating an example of training and using a machine learning model for deployment with a multi-sensor test device for quality control scanning.

FIG. 2 is a diagram illustrating an example 200 of training and using a machine learning model for deployment with a multi-sensor test device for quality control scanning. The machine learning model training and usage described herein may be performed using a machine learning system. The machine learning system may include or may be included in a computing device, a server, a cloud computing environment, or the like, such as the test system 301 or the test device 330, described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the test data source 340 or the test device 330, among other examples, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the test data source 340 or the test device 330, among other examples. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a measurement by a LIDAR device, a second feature of an optical character recognition (OCR) of a part number, a third feature of an ultraviolet (UV) fluorescence, and so on. As shown, for a first observation, the first feature may have a value of "X1, Y1, Z1", the second feature may have a value of "ABC123", the third feature may have a value of a first emission spectrum ("Emission1"), and so on. These features and feature values are provided as examples, and may differ in other examples. For example, the feature set may include one or more of the following features: sensor measurements from optical imaging, polarimetry, acoustic microscopy, ultrasonic thermography, time of flight diffraction (e.g., using ultrasonic sensing), photogrammetry, a microgram scale, airborne molecular contamination (AMC) outgassing, objection recognition, or computer vision, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is whether a defect is present, which has a value of "Yes" for the first observation. In another example, the target variable may include a type of defect (e.g., whether a detected defect is a scratch, a dent, a surface-coating-roughness issue, etc.).

The feature set and target variable described above are provided as examples, and other examples may differ from what is described above. For example, for a target variable of how critical a defect is (e.g., whether a part is to be failed based on the presence of a defect), the feature set may include defects that are present, predicted failure rate associated with each defect, or cost of repair of each defect, among other examples. Similarly, for a target variable of a classification of a defect (e.g., a target variable of an identification of the specific defect, rather than a target variable of a presence of any defect), the feature set may include similar features to those described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, the machine learning system may use a k-nearest neighbor algorithm or a support vector machine algorithm to classify identified defects into different clusters. Additionally, or alternatively, the machine learning system may use a decision tree algorithm or decision model to determine whether a defect satisfies a failure threshold. In another example, the machine learning system may use a decision tree algorithm or decision model to generate a control model (e.g., an operation model to enable autonomous or automated control of a test device 330). After training, the machine learning system may store the machine learning model as a trained machine learning model 225 to be used to analyze new observations.

As an example, the machine learning system may obtain training data for the set of observations based on a set of measurements performed by a set of different sensors and collected by test data source 340. Additionally, or alternatively, the machine learning system may obtain training data for the set of observations by test device 330. For example, when the test device 330 performs a set of measurements (and performs a defect detection determination using a first set of model parameters from the machine learning system), the test device 330 may provide the set of measurements to enable the machine learning system to generate an updated set of model parameters (and output the updated set of model parameters to the test device 330 to enable more accurate subsequent determinations by the test device 330).

As shown by reference number 230, the machine learning system may apply the trained machine learning model 225 to a new observation, such as by receiving a new observation and inputting the new observation to the trained machine learning model 225. As shown, the new observation may include a first feature of a LIDAR measurement, a second feature of an OCR-based identification of a part number, a third feature of an emission spectrum measurement based on UV fluorescence, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "Yes" for the target variable of whether a defect is present with an object for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, rejecting the object. The first automated action may include, for example, adjusting one or more manufacturing parameters associated with manufacturing the object to avoid the defect occurring in other objects. For example, when the defect is associated with a thermal stressing, the first automated action may include adjusting one or more parameters of a thermal cycle (e.g., a temperature, a rate of change of a temperature, or an amount of time that objects are subjected to a temperature) to reduce a likelihood of thermal stressing causing a defect in other objects.

As another example, if the machine learning system were to predict a value of "No" for the target variable of whether a defect is present with an object, then the machine learning system may provide a second (e.g., different) recommendation (e.g., ship the object to a customer) and/or may perform or cause performance of a second (e.g., different) automated action (e.g., generating shipping information for the object). As another example, another automated for a value of "No" for the target variable of whether a defect is present with an object, may include passing the object for installation in a device (e.g., when a memory device is determined to be without a defect, the machine learning system can recommend installation of the memory device within a computing system). Accordingly, one example use of the machine learning system can be as a quality control controller for an automated manufacturing and/or assembly process for computing devices.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first type of defect, such as a thermal stressing related defect), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the automated action of adjusting parameters for thermal cycling.

As another example, if the machine learning system were to classify the new observation in a second cluster (e.g., a second type of defect, such as an outgassing type of defect), then the machine learning system may provide a second (e.g., different) recommendation (e.g., limiting installation of such a component to devices that are operated away from humans) and/or may perform or cause performance of a second (e.g., different) automated action, such as adjusting a level of air-cycling in a manufacturing process to exhaust the outgassing during manufacturing.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information.

For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include subsequent measurements performed by the test device 330.

In this way, the machine learning system may apply a rigorous and automated process to defect detection for objects, components, and/or devices. The machine learning system enables recognition and/or identification of tens, hundreds, thousands, or millions of features and/or feature values for tens, hundreds, thousands, or millions of observations, thereby increasing accuracy and consistency and reducing delay associated with defect detection relative to requiring computing resources to be allocated for tens, hundreds, or thousands of operators or sensor devices to manually detect defects using the features or feature values.

As indicated above, FIG. 2 is provided as an example. Other examples may differ from what is described in connection with FIG. 2.

Figure 3:
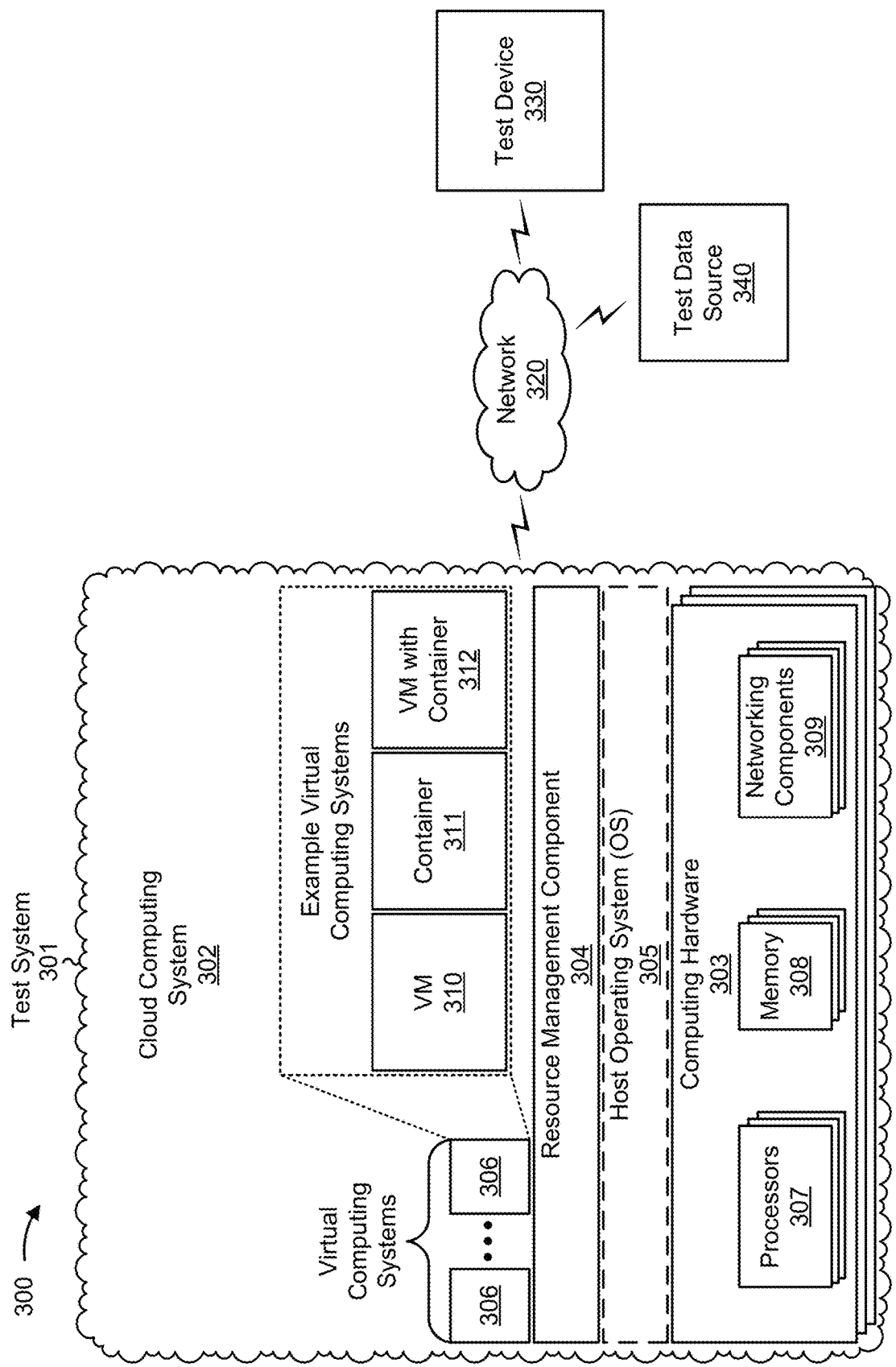
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a test system 301, which may include one or more elements of and/or may execute within a cloud computing system 302. The cloud computing system 302 may include one or more elements 303-312, as described in more detail below. As further shown in FIG. 3, environment 300 may include a network 320, a test device 330, and/or a test data source 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the test system 301 may include one or more elements 303-312 of the cloud computing system 302, may execute within the cloud computing system 302, and/or may be hosted within the cloud computing system 302, in some implementations, the test system 301 may not be cloud-based (e.g., may be implemented outside of a cloud computing system) or may be partially cloud-based. For example, the test system 301 may include one or more devices that are not part of the cloud computing system 302, such as device 400 of FIG. 4, which may include a stand-alone server or another type of computing device. The test system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The test device 330 may include one or more devices capable of obtaining, processing, and/or providing data associated with a set of measurements of an object, component, and/or device under test (DUT). For example the test device 330 may include a multi-sensor test device. In some implementations, the test device 330 may include an enclosure (e.g., a housing) with a set of openings, a set of sensors (e.g., within the enclosure and aligned to the set of openings), or a controller (e.g., to control the set of sensors), among other examples. In some implementations, the test device 330 may include a test bed for receiving an object, component, and/or DUT. For example, the test device 330 may have an opening in the enclosure and may receive an object for testing via the opening. Additionally, or alternatively, the test device 330 may have a stage aligned to one or more openings in the enclosure (e.g., openings for sensor measurement). In this case, the test device 330 may receive an object for testing on the stage and may perform measurements using the set of sensors, which may capture measurements of the object on the stage.

In some implementations, the test device 330 may be installed within or may comprise an inspection station (e.g., as part of a manufacturing line). The inspection station may include an open and closable frame (e.g., an open cube with protective shutters), a set of sensors attached to the frame, or a scale at a base of the frame, among other examples. As one example, the test device may include a set of optical cameras and illumination sources, a set of infrared (IR) cameras, a set of selectable polarimetry filters aligned to one or more cameras, an X-ray source and receiver, an ultraviolet (UV) source and receiver, an acoustic source and receiver, or a chemical sensor, among other examples. In some implementations, the test device 330 may have a rotating element, such as a rotating base to enable a DUT to be reoriented with respect to one or more sensors of the test device 330.

In some implementations, the test device 330 may have a control model or may be controlled by the test system 301 using a control model. For example, the control model may select a subset of possible sensor measurements to perform on a DUT (e.g., by activating or deactivating a subset of sensors). In this case, the control model may receive the subset of sensor measurements, determine whether defect detection is possible using the subset of sensor measurements, and, if not, control the test device 330 to perform another subset of possible sensor measurements. In other words, the control model enables the test device 330 to save power and/or processing resources by controlling the test device 330 to only perform as many sensor measurements as is useful to obtain a threshold level of confidence in a defect detection (or lack of defect detection) determination.

The test data source 340 may include one or more devices capable of obtaining, processing, and/or providing data for training a model. For example, the test data source 340 may obtain measurement data from many different sensors and train a model to use the measurement data from the many different sensors to detect a defect. In this case, the model may be deployed for use with the test device 330 (e.g., model parameters for the model may be stored locally on each test device 330 or each test device may upload data to and receive model output from the cloud computing system 302), which incorporates the many different sensors into a single unified test device rather than as separate components. In some implementations, the test data source 340 may obtain and provide correlation information. The correlation information may include information indicating whether a defect was detected in a device for which a set of measurements have been obtained, thereby enabling training of a model to identify defects from measurement data.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
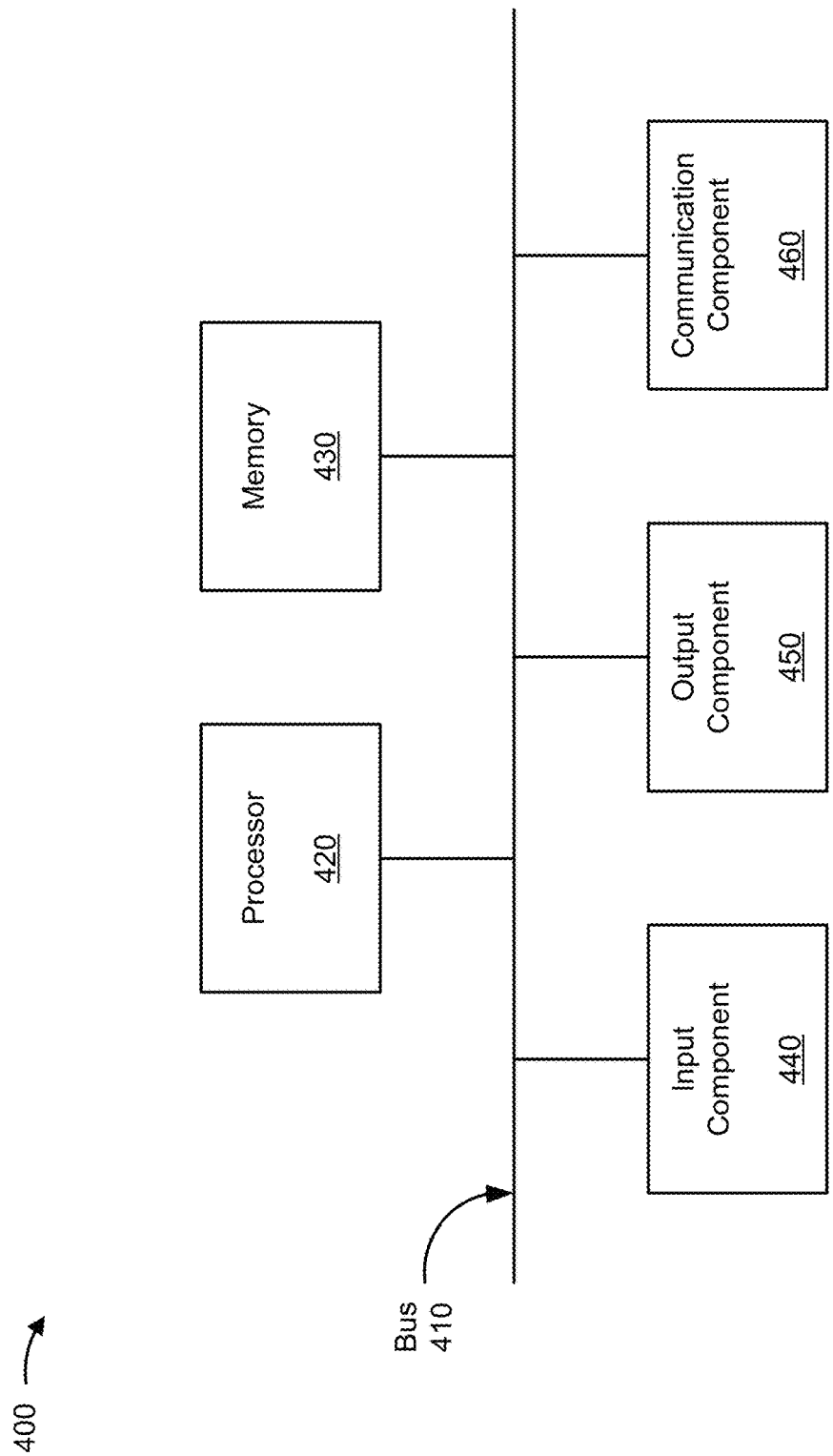
FIG. 4 is a diagram of example components of a device associated with a multi-sensor test device for quality control scanning.

FIG. 4 is a diagram of example components of a device 400 associated with a multi-sensor test device for quality control scanning. Device 400 may correspond to test system 301, test device 330, and/or test data source 340. In some implementations, test system 301, test device 330, and/or test data source 340 may include one or more devices 400 and/or one or more components of device 400. As shown in FIG. 4, device 400 may include a bus 410, a processor 420, a memory 430, an input component 440, an output component 450, and a communication component 460.

Bus 410 may include one or more components that enable wired and/or wireless communication among the components of device 400. Bus 410 may couple together two or more components of FIG. 4, such as via operative coupling, communicative coupling, electronic coupling, and/or electric coupling. Processor 420 may include a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 may include one or more processors capable of being programmed to perform one or more operations or processes described elsewhere herein.

Memory 430 may include volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 may include one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
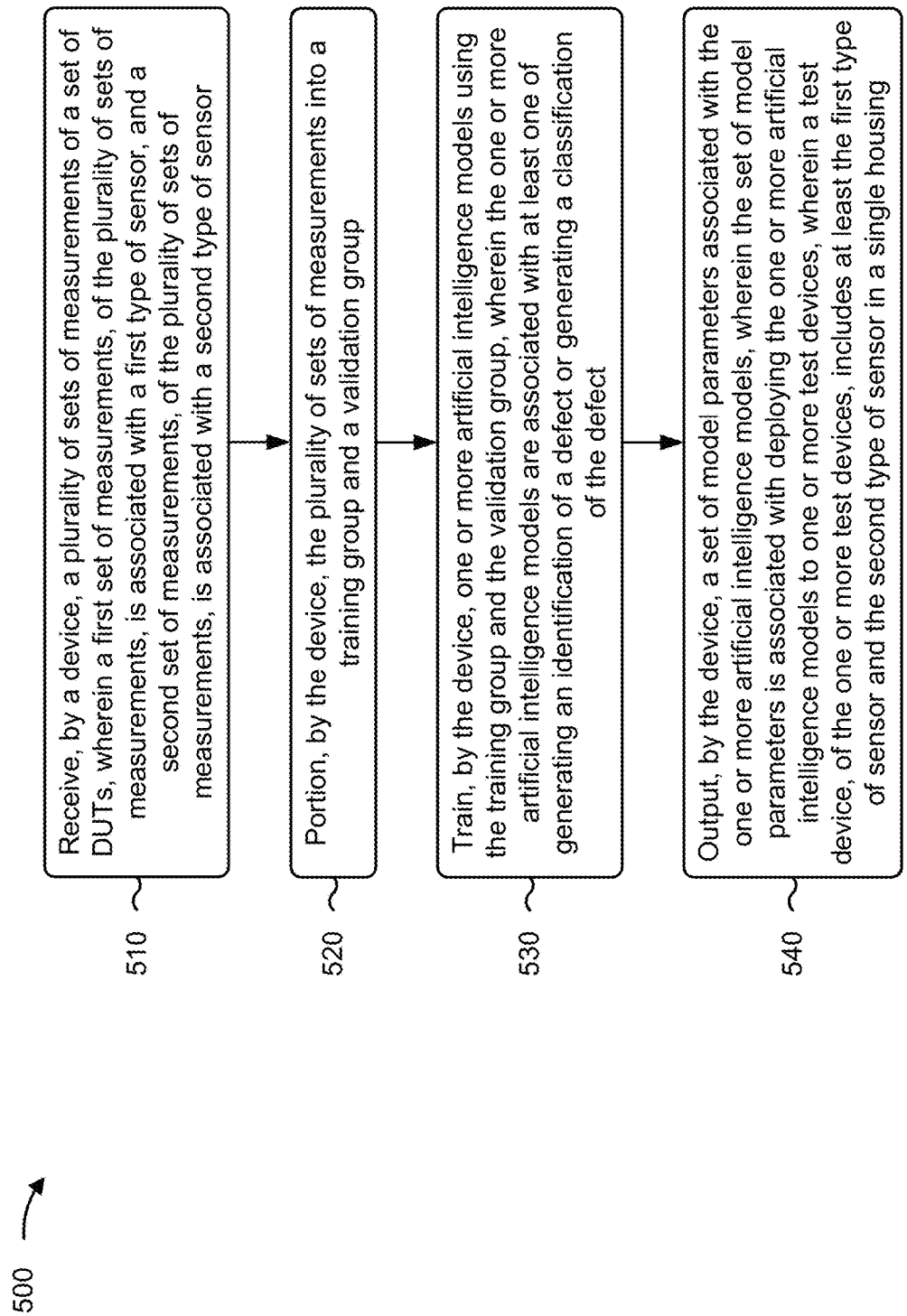
FIG. 5 is a flowchart of an example method associated with training artificial intelligence models for deployment with a multi-sensor test device for quality control scanning.

FIG. 5 is a flowchart of an example method 500 associated with training artificial intelligence models for deployment with a multi-sensor test device for quality control scanning. In some implementations, a device (e.g., the test system 106 or the test system 301) may perform or may be configured to perform one or more process blocks of FIG. 5. In some implementations, another device or a group of devices separate from or including the device (e.g., the set of sensors 102, the test device 108, the test device 330, and/or the test data source 340) may perform or may be configured to perform one or more process blocks of FIG. 5. Additionally, or alternatively, one or more components of the device (e.g., the test system 106 or the test system 301) may perform or may be configured to perform one or more process blocks of FIG. 5.

As shown in FIG. 5, the method 500 may include receiving a plurality of sets of measurements of a set of DUTs, wherein a first set of measurements, of the plurality of sets of measurements, is associated with a first type of sensor, and a second set of measurements, of the plurality of sets of measurements, is associated with a second type of sensor (block 510). As further shown in FIG. 5, the method 500 may include portioning the plurality of sets of measurements into a training group and a validation group (block 520). As further shown in FIG. 5, the method 500 may include training one or more artificial intelligence models using the training group and the validation group, wherein the one or more artificial intelligence models are associated with at least one of generating an identification of a defect or generating a classification of the defect (block 530). In some implementations, rather than training and/or validating a model, the method 500 may include obtaining a model or other computing process (e.g., a computer vision module) for use. As further shown in FIG. 5, the method 500 may include outputting a set of model parameters associated with the one or more artificial intelligence models, wherein the set of model parameters is associated with deploying the one or more artificial intelligence models to one or more test devices, wherein a test device, of the one or more test devices, includes at least the first type of sensor and the second type of sensor in a single housing (block 540).

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein, such as the operations described in connection with FIGS. 1A-1D.

FIG. 6 is a flowchart of an example method 600 associated with using a multi-sensor test device for quality control scanning. In some implementations, a test device (e.g., the test device 108 or the test device 330) may perform or may be configured to perform one or more process blocks of FIG.

6. In some implementations, another device or a group of devices separate from or including the test device (e.g., the set of sensors 102, the test system 106, the test system 301, and/or the test data source 340) may perform or may be configured to perform one or more process blocks of FIG. 6. Additionally, or alternatively, one or more components of the test device (e.g., the test device 108 or the test device 330) may perform or may be configured to perform one or more process blocks of FIG. 6.

As shown in FIG. 6, the method 600 may include initiating a set of measurements by a set of sensors of the test device and of a DUT, wherein the DUT is a memory device (block 610). As further shown in FIG. 6, the method 600 may include obtaining the set of measurements of the DUT from the set of sensors based on initiating the set of measurements (block 620). As further shown in FIG. 6, the method 600 may include analyzing the set of measurements of the DUT, using a first model, to identify one or more defects present with the DUT (block 630). As further shown in FIG. 6, the method 600 may include determining, using a second model, that the one or more defects present with the DUT satisfy a failure threshold (block 640). As further shown in FIG. 6, the method 600 may include providing, based on the failure threshold being satisfied for the DUT, an output indicating that the failure threshold is satisfied for the DUT and a classification of the one or more defects, wherein the classification is based on an output of a third model (block 650). In this case, for example, the third model may be a classification model for classifying defects or a recommendation model for providing recommendations relating to classifications of defects.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein, such as the operations described in connection with FIGS. 1A-1D.

In some implementations, a test device includes an enclosure; a set of sensors disposed within the enclosure; a set of openings in the enclosure aligned to the set of sensors; and a controller coupled to the set of sensors and configured to: initiate a set of measurements, by the sensors, of an object using the set of sensors; obtain the set of measurements of the object from the sensors based on initiating the set of measurements; analyze the set of measurements of the object, using a computer vision model, to identify whether one or more defects are present with the object; determine, using an artificial intelligence model of object failure, whether a failure threshold is satisfied for the object based on determining whether the one or more defects are present with the object; and provide, based on whether the failure threshold is satisfied for the object: first output, the first output indicating that the failure threshold is not satisfied for the object, the first output including a classification of at least one defect present with the object determined based at least in part on a defect classification model, or second output, the second output identifying a classification of a failure of the object based on the failure threshold being satisfied for the object.

In some implementations, a method includes receiving, by a device, a plurality of sets of measurements of a set of DUTs, wherein a first set of measurements, of the plurality of sets of measurements, is associated with a first type of sensor, and a second set of measurements, of the plurality of sets of measurements, is associated with a second type of sensor; portioning, by the device, the plurality of sets of measurements into a training group and a validation group; training, by the device, one or more artificial intelligence models using the training group and the validation group, wherein the one or more artificial intelligence models are associated with at least one of generating an identification of a defect or generating a classification of the defect; and outputting, by the device, a set of model parameters associated with the one or more artificial intelligence models, wherein the set of model parameters is associated with deploying the one or more artificial intelligence models to one or more test devices, wherein a test device, of the one or more test devices, includes at least the first type of sensor and the second type of sensor in a single housing.

In some implementations, a method includes initiating, by a test device, a set of measurements by a set of sensors of the test device and of a DUT, wherein the DUT is a memory device; obtaining, by the test device, the set of measurements of the DUT from the set of sensors based on initiating the set of measurements; analyzing, by the test device, the set of measurements of the DUT, using a first model, to identify one or more defects present with the DUT; determining, by the test device and using a second model, that the one or more defects present with the DUT satisfy a failure threshold; and providing, by the test device and based on the failure threshold being satisfied for the DUT, an output indicating that the failure threshold is satisfied for the DUT and a classification of the one or more defects, wherein the classification is based on an output of a third model.

The foregoing disclosure provides illustration and description but is not intended to be exhaustive or to limit the implementations to the precise forms disclosed. Modifications and variations may be made in light of the above disclosure or may be acquired from practice of the implementations described herein.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A test device, comprising:
   an enclosure;
   a set of sensors disposed within the enclosure;
   a set of openings in the enclosure aligned to the set of sensors; and
   a controller coupled to the set of sensors configured to:
      initiate a set of measurements including at least one imaging measurement and at least one non-imaging measurement, by the set of sensors, of an object using the set of sensors;
      obtain the set of measurements of the object from the sensors based on initiating the set of measurements;
      analyze the set of measurements of the object, using a computer vision model, to identify whether one or more defects are present with the object;
      apply an artificial intelligence model of object failure to the at least one imaging measurement and the at least one non-imaging measurement to determine whether a failure threshold is satisfied for the object based on determining whether the one or more defects are present with the object; and
      provide, based on whether the failure threshold is satisfied for the object:
         first output,
            the first output indicating that the failure threshold is not satisfied for the object, and
            the first output including a classification of at least one defect present with the object determined based at least in part on a defect classification model, or
         second output,
            the second output identifying a classification of a failure of the object based on the failure threshold being satisfied for the object.

2. The test device of claim 1, wherein the controller, when analyzing the set of measurements, is configured to:
   compare the set of measurements to a set of reference measurements of a reference object, the reference object not having one or more defects present; and
   determining that one or more defects are present with the object based on comparing the set of measurements to the set of reference measurements.

3. The test device of claim 1, wherein the controller is configured to:
   receive at least one measurement from at least one sensor not included in the enclosure; and
   include the at least one measurement in the set of measurements.

4. The test device of claim 1, wherein the test device is a handheld test device.

5. The test device of claim 1, wherein the set of measurements includes at least one of:
   an optical imaging measurement,
   a light detection and ranging (LIDAR) measurement,
   a polarimetry measurement,
   an acoustic microscopy measurement,
   an ultrasonic thermography measurement,
   a time-of-flight diffraction with ultrasonic measurement,
   an optical character recognition measurement,
   a photogrammetry measurement,
   a microgram measurement, or
   an outgassing measurement.

6. The test device of claim 1, wherein the controller is configured to:
   determine that one or more defects are present with the object.

7. The test device of claim 6, wherein the one or more defects present with the object include at least one of:
   a wear defect,
   a deformation defect,
   a particulate matter defect,
   a scratch defect,
   a damage defect,
   a coating uniformity defect,
   an internal stress defect,
   a part identity error defect,
   an outgassing defect, or
   a size defect.

8. The test device of claim 1, wherein the set of sensors includes two or more sensors.

9. The test device of claim 1, wherein the set of sensors includes three or more sensors.

10. The test device of claim 1, wherein the set of sensors includes four or more sensors.

11. A method, comprising:
    initiating, by a set of sensors of a test device comprising an enclosure, the set of sensors disposed within the enclosure, and a set of openings in the enclosure aligned to the set of sensors, a set of measurements including at least one imaging measurement and at least one non-imaging measurement of an object using the set of sensors;
obtaining, by the test device, the set of measurements of the object from the set of sensors based on initiating the set of measurements;
analyzing, by the test device, the set of measurements of the object, using a computer vision model, to identify whether one or more defects are present with the object;
applying, by the test device, an artificial intelligence model of object failure to the at least one imaging measurement and the at least one non-imaging measurement to determine whether a failure threshold is satisfied for the object based on determining whether the one or more defects are present with the object; and
providing, by the test device and based on whether the failure threshold is satisfied for the object:
first output,
the first output indicating that the failure threshold is not satisfied for the object, and
the first output including a classification of at least one defect present with the object determined based at least in part on a defect classification model; or
second output,
the second output identifying a classification of a failure of the object based on the failure threshold being satisfied for the object.

12. The method of claim 11, wherein analyzing the set of measurements comprises:
comparing the set of measurements to a set of reference measurements of a reference object, the reference object not having one or more defects present; and
determining that one or more defects are present with the object based on comparing the set of measurements to the set of reference measurements.

13. The method of claim 11, further comprising:
receiving at least one measurement from at least one sensor not included in the enclosure; and
including the at least one measurement in the set of measurements.

14. The method of claim 11, wherein the test device is a handheld test device.

15. The method of claim 11, wherein the set of measurements includes at least one of:
an optical imaging measurement,
a light detection and ranging (LIDAR) measurement,
a polarimetry measurement,
an acoustic microscopy measurement,
an ultrasonic thermography measurement,
a time-of-flight diffraction with ultrasonic measurement,
an optical character recognition measurement,
a photogrammetry measurement,
a microgram measurement, or
an outgassing measurement.

16. The method of claim 11, further comprising:
determining that one or more defects are present with the object.

17. The method of claim 16, wherein the one or more defects present with the object include at least one of:
a wear defect,
a deformation defect,
a particulate matter defect,
a scratch defect,
a damage defect,
a coating uniformity defect,
an internal stress defect,
a part identity error defect,
an outgassing defect, or
a size defect.

18. The method of claim 11, wherein the set of sensors includes two or more sensors.

19. The method of claim 11, wherein the set of sensors includes three or more sensors.

20. The method of claim 11, wherein the set of sensors includes four or more sensors.

21. A non-transitory computer-readable medium storing a set of instructions, the set of instructions comprising:
one or more instructions that, when executed by one or more processors of a test device comprising a set of sensors, an enclosure, the set of sensors disposed within the enclosure, and a set of openings in the enclosure aligned to the set of sensors, cause the test device to:
initiate, by the set of sensors, a set of measurements including at least one imaging measurement and at least one non-imaging measurement of an object using the set of sensors;
obtain the set of measurements of the object from the set of sensors based on initiating the set of measurements;
analyze the set of measurements of the object, using a computer vision model, to identify whether one or more defects are present with the object;
apply an artificial intelligence model of object failure to the at least one imaging measurement and the at least one non-imaging measurement to determine whether a failure threshold is satisfied for the object based on determining whether the one or more defects are present with the object; and
provide, based on whether the failure threshold is satisfied for the object:
first output,
the first output indicating that the failure threshold is not satisfied for the object, and
the first output including a classification of at least one defect present with the object determined based at least in part on a defect classification model; or
second output,
the second output identifying a classification of a failure of the object based on the failure threshold being satisfied for the object.

22. The non-transitory computer-readable medium of claim 21, wherein the one or more instructions further cause the test device to:
compare the set of measurements to a set of reference measurements of a reference object, the reference object not having one or more defects present; and
determine that one or more defects are present with the object based on comparing the set of measurements to the set of reference measurements.

23. The non-transitory computer-readable medium of claim 21, wherein the one or more instructions further cause the test device to:
receive at least one measurement from at least one sensor not included in the enclosure; and
include the at least one measurement in the set of measurements.

24. The non-transitory computer-readable medium of claim 21, wherein the test device is a handheld test device.

25. The non-transitory computer-readable medium of claim 21, wherein the set of measurements includes at least one of:
an optical imaging measurement, a light detection and ranging (LIDAR) measurement,
a polarimetry measurement,
an acoustic microscopy measurement,
an ultrasonic thermography measurement,
a time-of-flight diffraction with ultrasonic measurement,
an optical character recognition measurement,
a photogrammetry measurement,
a microgram measurement, or
an outgassing measurement.

* * * * *